(12) United States Patent
Ding et al.

(10) Patent No.: US 12,505,908 B1
(45) Date of Patent: Dec. 23, 2025

(54) SYSTEM FOR PREDICTING IMMUNOTHERAPEUTIC EFFICACY FOR COLORECTAL CANCER

(71) Applicant: SUN YAT-SEN UNIVERSITY CANCER CENTER (SYSUCC), Guangdong (CN)

(72) Inventors: Peirong Ding, Guangdong (CN); Wu Jiang, Guangdong (CN); Shuoyu Xu, Guangdong (CN); Weijian Mei, Guangdong (CN); Le'en Liao, Guangdong (CN); Jiehai Yu, Guangdong (CN); Zhigang Hong, Guangdong (CN); Shihong Chen, Guangdong (CN); Wanjun Yang, Guangdong (CN); Muxu Zheng, Guangdong (CN)

(73) Assignee: SUN YAT-SEN UNIVERSITY CANCER CENTER (SYSUCC), Guangzhou (CN)

( * ) Notice: Subject to any disclaimer, the term of this patent is extended or adjusted under 35 U.S.C. 154(b) by 0 days.

(21) Appl. No.: 19/264,303

(22) Filed: Jul. 9, 2025

(30) Foreign Application Priority Data

Jul. 11, 2024 (CN) .......................... 202410923897.9

(51) Int. Cl.
*G16H 20/17* (2018.01)
*G06T 7/00* (2017.01)
*G16H 30/40* (2018.01)

(52) U.S. Cl.
CPC ........... *G16H 20/17* (2018.01); *G06T 7/0012* (2013.01); *G16H 30/40* (2018.01); *G06T 2207/30028* (2013.01)

(58) Field of Classification Search
CPC ... A61B 6/5217; A61B 5/7264; G06T 7/0012; G06T 2207/30096; G06T 2207/30028;
(Continued)

(56) References Cited

U.S. PATENT DOCUMENTS 9,726,676 B2 * 8/2017 Grabe ................ G01N 33/6893
2018/0357816 A1 * 12/2018 Gholap .............. G01N 33/5091
(Continued)

FOREIGN PATENT DOCUMENTS

| CN | 114863999 A | 8/2022 |
|---|---|---|
| CN | 115295154 A | 11/2022 |

(Continued)

OTHER PUBLICATIONS

Notification to Grant Patent Right for Invention, Chinese Application No. 202410923897.9, mailed Mar. 7, 2025 (3 pages).
(Continued)

*Primary Examiner* — Courtney Joan Nelson
(74) *Attorney, Agent, or Firm* — HOWARD M COHN and Associates, LLC

(57) ABSTRACT

A system for predicting immunotherapeutic efficacy for colorectal cancer performs operations of: obtaining a digital image of a biological tissue a colorectal cancer patient; predicting a tissue type parameter and a cell type parameter corresponding to the digital image of the biological tissue based on a classifier algorithm model; determining a plurality of cell feature parameters corresponding to the digital image of the biological tissue based on a calculating rule of a plurality of cell features corresponding to the tissue type parameter and the cell type parameter; calculating a therapeutic efficacy score corresponding to the colorectal cancer patient according to the plurality of cell feature parameters and a predetermined parameter scoring rule; and the therapeutic efficacy score is configured to predict the therapeutic
(Continued)

efficacy of the colorectal cancer patient receiving immunotherapy.

4 Claims, 2 Drawing Sheets

(58) Field of Classification Search
CPC ........ G16H 50/20; G16H 20/10; G16H 30/40; G16H 30/20; G16H 50/30; G16H 20/17
See application file for complete search history.

(56) References Cited

U.S. PATENT DOCUMENTS

| | | | |
|---|---|---|---|
| 2023/0049979 A1* | 2/2023 | Issler | ............ G16B 25/00 |
| 2024/0272161 A1* | 8/2024 | Taube | ......... G01N 33/57484 |

FOREIGN PATENT DOCUMENTS

| | | |
|---|---|---|
| CN | 116364231 A | 6/2023 |
| CN | 116646088 A | 8/2023 |

OTHER PUBLICATIONS

CNIPA, Office Action issued for Chinese Application No. 202410923897.9, mailed Oct. 30, 2024 (7 pages).

Xiuliu Guo et al., "China Modern Doctor", Application and prospect of artificial intelligence in diagnosis and treatment of pancreatic diseases, vol. 58, No. 17, pp. 194-198, issuing date Jun. 18, 2020.

* cited by examiner

SYSTEM FOR PREDICTING IMMUNOTHERAPEUTIC EFFICACY FOR COLORECTAL CANCER

CROSS REFERENCE TO RELATED APPLICATIONS

The present application claims the priority of the Chinese patent application No. 202410923897.9, filed on Jul. 11, 2024, contents of which are incorporated herein by its entireties.

TECHNICAL FIELD

Embodiments of the present disclosure relate to the technical field of data processing, and more specifically, to a system for predicting immunotherapeutic efficacy for colorectal cancer.

BACKGROUND

Colorectal cancer is the most common malignant digestive tumor, and immunotherapy has become an important means for treating the colorectal cancer. In various guidelines, including guidelines of the National Comprehensive Cancer Network (NCCN) and guidelines of the Chinese Society of Clinical Oncology (CSCO), immunotherapy, such as by using the pabrolizumab, occupies an important place in treating dMMR/MSI-H colorectal cancer patients. Clinically, a MisMatchRepair (MMR) status is often assessed based on immunohistochemistry of pathologic tissues, and a microsatelliteinstablility (MSI) status is assessed based on PCR. Alternatively, the MSI status and mutation of the MMR gene are assessed via the second-generation sequencing technology. These assessments are used to guide the immunotherapy. However, the above tests are expensive, time-consuming, and technically demanding, and therefore, the above tests may not be easily performed in primary care hospitals. Pathomics, as a newly-emerging technology, has been widely used for clinically relevant efficacy prediction. Recently, various studies have confirmed that pathomical features, such as a density of lymphocytes and spatial distribution of the lymphocytes identified by the pathomics, are associated with immunotherapy efficacy. However, most of these studies are conducted in tumors such as lung cancer and melanoma and are not combined with image analysis. The colorectal cancer, as a unique tumor of the digestive system, has significantly different pathomical features from other types of tumors. Therefore, it is necessary to construct a method for assessing a treatment effect specific to the colorectal cancer. It can be seen that the related art has defects that need to be solved urgently.

SUMMARY

The present disclosure provides a system for predicting immunotherapeutic efficacy for the colorectal cancer. By applying the system, accuracy and an efficiency of predicting a therapeutic efficacy of the colorectal cancer may be improved, prediction costs may be reduced, accurate data basis may be provided for subsequent treatments or research.

In a first aspect, the present disclosure provides a system for predicting the immunotherapeutic efficacy for the colorectal cancer. The method includes following operations.

A digital image of a biological tissue a colorectal cancer patient is obtained.

A tissue type parameter and a cell type parameter corresponding to the digital image of the biological tissue are predicted based on a classifier algorithm model.

A plurality of cell feature parameters corresponding to the digital image of the biological tissue are determined based on a calculating rule of a plurality of cell features corresponding to the tissue type parameter and the cell type parameter.

A therapeutic efficacy score corresponding to the colorectal cancer patient is calculated according to the plurality of cell feature parameters and a predetermined parameter scoring rule; and the therapeutic efficacy score is configured to predict the therapeutic efficacy of the colorectal cancer patient receiving immunotherapy.

In an embodiment, in the first aspect, predicting the tissue type parameter and the cell type parameter corresponding to the digital image of the biological tissue based on the classifier algorithm model, includes following operations.

The digital image of the biological tissue is input into a trained tissue region recognition algorithm model, so as to obtain a plurality of tissue regions corresponding to the digital image of the biological tissue and obtain a tissue type corresponding each of the plurality of tissue regions.

The digital image of the biological tissue is input into a trained cell recognition algorithm model, so as to obtain a plurality of cell regions corresponding to the digital image of the biological tissue and obtain a cell type corresponding to each of the plurality of cell regions.

In an embodiment, in the first aspect, determining the plurality of cell feature parameters corresponding to the digital image of the biological tissue based on the calculating rule of the plurality of cell features corresponding to the tissue type parameter and the cell type parameter, includes following operations.

The number of tissue regions each having a mucus constituent type as the tissue type is calculated.

A ratio of the number of the tissue regions to the total number of all of the plurality of tissue regions is calculated, so as to obtain a mucus region ratio parameter.

In an embodiment, in the first aspect, determining the plurality of cell feature parameters corresponding to the digital image of the biological tissue based on the calculating rule of the plurality of cell features corresponding to the tissue type parameter and the cell type parameter, includes following operations.

Tissue regions, each having a tumor type as the tissue type, are screened, so as to obtain a plurality of tumor tissue regions.

A minimum outer polygon of the plurality of tumor tissue regions is calculated, so as to obtain a tumor combination region.

The tumor combination region is divided into a plurality of sub-regions, and for each of the plurality of sub-regions, following operations are performed.

In the sub-region, the number of cell regions, each having the lymphocyte as the cell type, is calculated, so as to obtain the number of lymphocytes.

In the sub-region, the number of cell regions, each having the tumor cell as the cell type, is calculated, so as to obtain the number of tumor cells.

A ratio of the number of lymphocytes to a first total number of cells is calculated, so as to obtain a lymphocyte percentage. The first total number of cells is a sum of the number of lymphocytes and the number of tumor cells.

A ratio of the number of tumor cells to the total number of cells is calculated, so as to obtain a tumor cell percentage.

A lymphocyte abundance parameter corresponding to the tumor combination region is calculated, based on the lymphocyte percentage and the tumor cell percentage corresponding to each of the plurality of sub-regions and based on a co-localization coefficient algorithm.

In an embodiment, in the first aspect, determining the plurality of cell feature parameters corresponding to the digital image of the biological tissue based on the calculating rule of the plurality of cell features corresponding to the tissue type parameter and the cell type parameter, includes following operations.

In each of the plurality of sub-regions, the number of cell regions, each having a plasma cell as the cell type, is calculated so as to obtain the number of plasma cells.

In each of the plurality of sub-regions, a ratio of the number of plasma cells to the second total number of cells is calculated, so as to obtain a plasma cell percentage in each of the plurality of sub-regions. The second total number of cells is a sum of the number of plasma cells and the number of tumor cells.

A plasma cell co-localization parameter corresponding to the tumor combination region is calculated, based on the plasma cell percentage and the tumor cell percentage in each of the plurality of sub-regions and based on the co-localization coefficient algorithm.

In an embodiment, in the first aspect, determining the plurality of cell feature parameters corresponding to the digital image of the biological tissue based on the calculating rule of the plurality of cell features corresponding to the tissue type parameter and the cell type parameter, includes following operations.

In each of the plurality of sub-regions, the number of cell regions, each having a neutrophil as the cell type, is calculated so as to obtain the number of neutrophils.

In each of the plurality of sub-regions, a ratio of the number of neutrophils to the third total number of cells is calculated, so as to obtain a neutrophil percentage in each of the plurality of sub-regions. The third total number of cells is a sum of the number of neutrophils and the number of tumor cells.

A neutrophil co-localization parameter corresponding to the tumor combination region is calculated, based on the neutrophil percentage and the tumor cell percentage in each of the plurality of sub-regions and based on the co-localization coefficient algorithm.

In an embodiment, in the first aspect, calculating the therapeutic efficacy score corresponding to the colorectal cancer patient according to the plurality of cell feature parameters and the predetermined parameter scoring rule, includes following operations.

A first effect score corresponding to the mucus region ratio parameter is calculated, and the first effect score is inversely proportional to the mucus region ratio parameter.

A second effect score corresponding to the lymphocyte abundance parameter, a second effect score corresponding to the plasma cell co-localization parameter, and a second effect score corresponding to the neutrophil co-localization parameter are calculated. The second effect score corresponding to the lymphocyte abundance parameter is positively proportional to the lymphocyte abundance parameter. The second effect score corresponding to the plasma cell co-localization parameter is positively proportional to the plasma cell co-localization parameter. The second effect score corresponding to the neutrophil co-localization parameter is positively proportional to the neutrophil co-localization parameter.

The sum of the first effect score, the second effect score corresponding to the lymphocyte abundance parameter, the second effect score corresponding to the plasma cell co-localization parameter, and the second effect score corresponding to the neutrophil co-localization parameter is calculated to obtain the therapeutic efficacy score corresponding to the colorectal cancer patient.

In an embodiment, in the first aspect, calculating the sum of the first effect score, the second effect score corresponding to the lymphocyte abundance parameter, the second effect score corresponding to the plasma cell co-localization parameter, and the second effect score corresponding to the neutrophil co-localization parameter, so as to obtain the therapeutic efficacy score corresponding to the colorectal cancer patient, includes following operations.

A weighted summed average of the first effect score, the second effect score corresponding to the lymphocyte abundance parameter, the second effect score corresponding to the plasma cell co-localization parameter, and the second effect score corresponding to the neutrophil co-localization parameter, is calculated to obtain the therapeutic efficacy score corresponding to the colorectal cancer patient. A weight of the first effect score is positively proportional to a total area of all of the tissue regions each having the mucus constituent type as the tissue type. A weight of the second effect score corresponding to the lymphocyte abundance parameter is positively proportional to a total area of all of the cell regions each having the lymphocyte as the cell type. A weight of the second effect score corresponding to the plasma cell co-localization parameter is positively proportional to a total area of all of the cell regions each having the plasma cell as the cell type. A weight of the second effect score corresponding to the neutrophil co-localization parameter is positively proportional to a total area of all of the cell regions each having the neutrophil as the cell type.

In a second aspect, the present disclosure provides a system for predicting the immunotherapeutic efficacy for the colorectal cancer. The system includes the following.

An obtaining module is configured to obtain a digital image of a biological tissue a colorectal cancer patient.

A prediction module is configured to predict, based on a classifier algorithm model, a tissue type parameter and a cell type parameter corresponding to the digital image of the biological tissue.

A determination module is configured to determine, based on a calculating rule of a plurality of cell features corresponding to the tissue type parameter and the cell type parameter, a plurality of cell feature parameters corresponding to the digital image of the biological tissue.

A calculation module is configured to calculate, according to the plurality of cell feature parameters and a predetermined parameter scoring rule, a therapeutic efficacy score corresponding to the colorectal cancer patient. The therapeutic efficacy score is configured to predict the therapeutic efficacy of the colorectal cancer patient receiving immunotherapy.

In an embodiment, in the second aspect, predicting the tissue type parameter and the cell type parameter corresponding to the digital image of the biological tissue based on the classifier algorithm model, includes following operations.

The digital image of the biological tissue is input into a trained tissue region recognition algorithm model, so as to obtain a plurality of tissue regions corresponding to the digital image of the biological tissue and obtain a tissue type corresponding each of the plurality of tissue regions.

The digital image of the biological tissue is input into a trained cell recognition algorithm model, so as to obtain a plurality of cell regions corresponding to the digital image of the biological tissue and obtain a cell type corresponding to each of the plurality of cell regions.

In an embodiment, in the second aspect, determining the plurality of cell feature parameters corresponding to the digital image of the biological tissue based on the calculating rule of the plurality of cell features corresponding to the tissue type parameter and the cell type parameter, includes following operations.

The number of tissue regions each having a mucus constituent type as the tissue type is calculated.

A ratio of the number of the tissue regions to the total number of all of the plurality of tissue regions is calculated, so as to obtain a mucus region ratio parameter.

In an embodiment, in the second aspect, determining the plurality of cell feature parameters corresponding to the digital image of the biological tissue based on the calculating rule of the plurality of cell features corresponding to the tissue type parameter and the cell type parameter, includes following operations.

Tissue regions, each having a tumor type as the tissue type, are screened, so as to obtain a plurality of tumor tissue regions.

A minimum outer polygon of the plurality of tumor tissue regions is calculated, so as to obtain a tumor combination region.

The tumor combination region is divided into a plurality of sub-regions, and for each of the plurality of sub-regions, following operations are performed.

In the sub-region, the number of cell regions, each having the lymphocyte as the cell type, is calculated, so as to obtain the number of lymphocytes.

In the sub-region, the number of cell regions, each having the tumor cell as the cell type, is calculated, so as to obtain the number of tumor cells.

A ratio of the number of lymphocytes to a first total number of cells is calculated, so as to obtain a lymphocyte percentage. The first total number of cells is a sum of the number of lymphocytes and the number of tumor cells.

A ratio of the number of tumor cells to the total number of cells is calculated, so as to obtain a tumor cell percentage.

A lymphocyte abundance parameter corresponding to the tumor combination region is calculated, based on the lymphocyte percentage and the tumor cell percentage corresponding to each of the plurality of sub-regions and based on a co-localization coefficient algorithm.

In an embodiment, in the second aspect, determining the plurality of cell feature parameters corresponding to the digital image of the biological tissue based on the calculating rule of the plurality of cell features corresponding to the tissue type parameter and the cell type parameter, includes following operations.

In each of the plurality of sub-regions, the number of cell regions, each having a plasma cell as the cell type, is calculated so as to obtain the number of plasma cells.

In each of the plurality of sub-regions, a ratio of the number of plasma cells to the second total number of cells is calculated, so as to obtain a plasma cell percentage in each of the plurality of sub-regions. The second total number of cells is a sum of the number of plasma cells and the number of tumor cells.

A plasma cell co-localization parameter corresponding to the tumor combination region is calculated, based on the plasma cell percentage and the tumor cell percentage in each of the plurality of sub-regions and based on the co-localization coefficient algorithm.

In an embodiment, in the second aspect, determining the plurality of cell feature parameters corresponding to the digital image of the biological tissue based on the calculating rule of the plurality of cell features corresponding to the tissue type parameter and the cell type parameter, includes following operations.

In each of the plurality of sub-regions, the number of cell regions, each having a neutrophil as the cell type, is calculated so as to obtain the number of neutrophils.

In each of the plurality of sub-regions, a ratio of the number of neutrophils to the third total number of cells is calculated, so as to obtain a neutrophil percentage in each of the plurality of sub-regions. The third total number of cells is a sum of the number of neutrophils and the number of tumor cells.

A neutrophil co-localization parameter corresponding to the tumor combination region is calculated, based on the neutrophil percentage and the tumor cell percentage in each of the plurality of sub-regions and based on the co-localization coefficient algorithm.

In an embodiment, in the second aspect, calculating the therapeutic efficacy score corresponding to the colorectal cancer patient according to the plurality of cell feature parameters and the predetermined parameter scoring rule, includes following operations.

A first effect score corresponding to the mucus region ratio parameter is calculated, and the first effect score is inversely proportional to the mucus region ratio parameter.

A second effect score corresponding to the lymphocyte abundance parameter, a second effect score corresponding to the plasma cell co-localization parameter, and a second effect score corresponding to the neutrophil co-localization parameter are calculated. The second effect score corresponding to the lymphocyte abundance parameter is positively proportional to the lymphocyte abundance parameter. The second effect score corresponding to the plasma cell co-localization parameter is positively proportional to the plasma cell co-localization parameter. The second effect score corresponding to the neutrophil co-localization parameter is positively proportional to the neutrophil co-localization parameter.

The sum of the first effect score, the second effect score corresponding to the lymphocyte abundance parameter, the second effect score corresponding to the plasma cell co-localization parameter, and the second effect score corresponding to the neutrophil co-localization parameter is calculated to obtain the therapeutic efficacy score corresponding to the colorectal cancer patient.

In an embodiment, in the second aspect, calculating the sum of the first effect score, the second effect score corresponding to the lymphocyte abundance parameter, the second effect score corresponding to the plasma cell co-localization parameter, and the second effect score corresponding to the neutrophil co-localization parameter, so as to obtain the therapeutic efficacy score corresponding to the colorectal cancer patient, includes following operations.

A weighted summed average of the first effect score, the second effect score corresponding to the lymphocyte abundance parameter, the second effect score corresponding to the plasma cell co-localization parameter, and the second effect score corresponding to the neutrophil co-localization parameter, is calculated to obtain the therapeutic efficacy score corresponding to the colorectal cancer patient. A weight of the first effect score is positively proportional to a total area of all of the tissue regions each having the mucus constituent type as the tissue type. A weight of the second effect score corresponding to the lymphocyte abundance parameter is positively proportional to a total area of all of the cell regions each having the lymphocyte as the cell type. A weight of the second effect score corresponding to the plasma cell co-localization parameter is positively proportional to a total area of all of the cell regions each having the plasma cell as the cell type. A weight of the second effect score corresponding to the neutrophil co-localization parameter is positively proportional to a total area of all of the cell regions each having the neutrophil as the cell type.

In a third aspect, the present disclosure provides another system for predicting the immunotherapeutic efficacy for the colorectal cancer. The another system includes the following.

A memory is configured to store executable program code.

A processor is coupled to the memory.

The processor invokes the executable program codes stored in the memory to perform some or all of the operations in the method for predicting the immunotherapeutic efficacy for the colorectal cancer.

In a fourth aspect, the present disclosure provides a computer storage medium, the computer storage medium stores computer instructions, the computer instructions, when being invoked, are configured to execute some or all of the operations in the method for predicting the immunotherapeutic efficacy for the colorectal cancer as described in the first aspect.

Compared with the related art, the embodiments of the present disclosure have following technical effects.

According to the present disclosure, the tissue type and the cell type corresponding to the digital image of the biological tissue are firstly determined by means of the classifier algorithm. Subsequently, the plurality of cell feature parameters are determined based on corresponding feature calculation rules, and scoring is performed. In this way, the score that characterizes the therapeutic efficacy is obtained. The accuracy and the efficiency of predicting the therapeutic efficacy of the colorectal cancer are effectively improved, prediction costs are reduced, and accurate data basis is provided for subsequent treatments or research.

BRIEF DESCRIPTION OF THE DRAWINGS

In order to more clearly illustrate technical solutions in the embodiments of the present disclosure, the accompanying drawings to be used for describing the embodiments will be briefly introduced below. Apparently, the accompanying drawings in the following description are only some embodiments of the present disclosure, and any ordinary skilled person in the art may obtain other accompanying drawings based on these drawings without making creative work.

DETAILED DESCRIPTIONS

Figure 1:
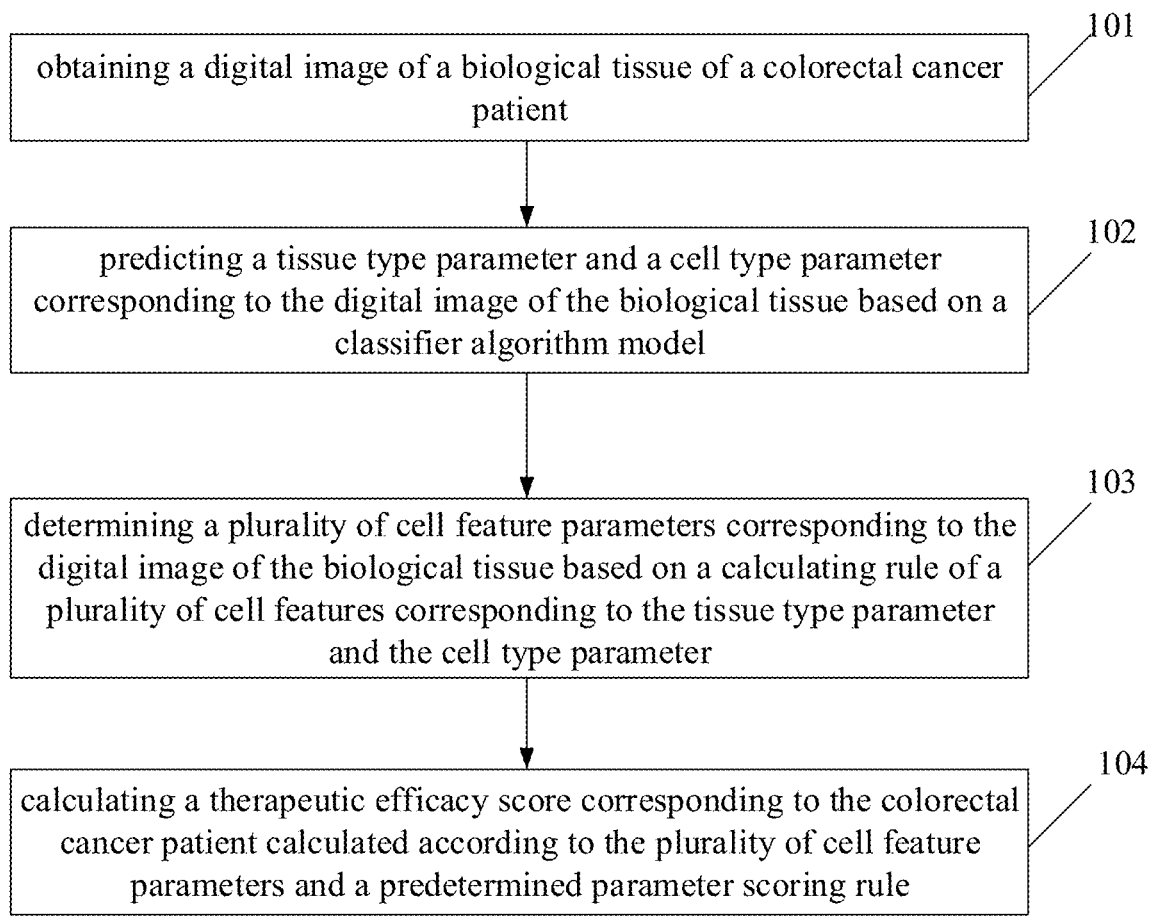
FIG. 1 is a flow chart of a method for predicting a therapeutic efficacy for the colorectal cancer according to some embodiments of the present disclosure.

In order to better understand the technical solutions of the present disclosure, the technical solutions in the embodiments of the present disclosure will be described clearly and completely in the following by referring to the accompanying drawings of the present disclosure. Apparently, the described embodiments are only a part of, not all of, the embodiments of the present disclosure. All other embodiments, which are obtained by any ordinary skilled person in the art based on the embodiments in the present disclosure without making creative work, shall fall within the scope of the present disclosure.

Terms "first", "second", and so on, in the specification, claims, and the drawings of the present disclosure are used to distinguish between different objects and are not used to describe a particular order. Furthermore, terms "include", "have" and any variations thereof are intended to cover non-exclusive inclusion. For example, a process, a method, an apparatus, a product or a device including a series of steps or units is not limited to the listed steps or units, but may further include steps or units that are not listed or that are inherently included in the process, the method, the apparatus, the product or the device.

Reference to "embodiments" herein means that particular features, structures or properties described in the embodiments may be included in at least one embodiment of the present disclosure. Presence of the term at various sections in the specification does not necessarily refer to one embodiment, nor a separate or an alternative embodiment that is mutually exclusive of other embodiments. Any ordinary skilled person in the art shall understand, both explicitly and implicitly, that the embodiments described herein may be combined with other embodiments.

Before describing technical embodiments of the present disclosure, the related art to which the embodiments of the present disclosure are directed will be described. Specifically, in clinical practice in the art, dMMR/MSI-H is the only biomarker that is commonly recognized as being able to be used to guide neoadjuvant immunotherapy for the colorectal cancer. In the art, it is believed that patients with the dMMR/MSI-H can benefit from the neoadjuvant immunotherapy, whereas patients with pMMR/MSS cannot benefit from the neoadjuvant immunotherapy. However, in clinical practice, it is found that there are some patients with the dMMR/MSI-H who do not benefit from the neoadjuvant immunotherapy, and there are some patients with the pMMR/MSS who do benefit from the neoadjuvant immunotherapy. Therefore, predicting which colorectal cancer patient can benefit from the neoadjuvant immunotherapy at an early stage is a clinically valuable scientific problem. The present disclosure can be applied to this prediction as well. Furthermore, there is no pathohistological method, in the art, for predicting the immunotherapy efficacy for the colorectal cancer, which is a special tumor type.

In order to solve a part or the entirety of the above problem in the art, the present disclosure provides a system for predicting the immunotherapy efficacy for the colorectal cancer. According to the present disclosure, the tissue type and the cell type corresponding to the digital image of the biological tissue are firstly determined by means of the classifier algorithm. Subsequently, the plurality of cell feature parameters are determined based on corresponding feature calculation rules, and scoring is performed. In this way, the score that characterizes the therapeutic efficacy is obtained. The accuracy and the efficiency of predicting the therapeutic efficacy of the colorectal cancer are effectively improved, prediction costs are reduced, and accurate data basis is provided for subsequent treatments or research.

Embodiment I

As shown in FIG. 1, FIG. 1 is a flow chart of a method for predicting a therapeutic efficacy for the colorectal cancer according to some embodiments of the present disclosure. The method for predicting the therapeutic efficacy for the colorectal cancer shown in FIG. 1 may be applied in a data processing system/a data processing device/a data processing server (the server includes a local processing server or a cloud processing server). As shown in FIG. 1, the method for predicting the therapeutic efficacy for the colorectal cancer may include the following operations.

In an operation 101, a digital image of a biological tissue of a colorectal cancer patient is obtained.

In an operation 102, a tissue type parameter and a cell type parameter corresponding to the digital image of the biological tissue are predicted based on a classifier algorithm model.

In an operation 103, a plurality of cell feature parameters corresponding to the digital image of the biological tissue are determined based on a calculating rule of a plurality of cell features corresponding to the tissue type parameter and the cell type parameter.

In an operation 104, a therapeutic efficacy score corresponding to the colorectal cancer patient is calculated according to the plurality of cell feature parameters and a predetermined parameter scoring rule.

In some embodiments, the therapeutic efficacy score is configured to predict the therapeutic efficacy of the colorectal cancer patient receiving immunotherapy.

In some embodiments, the digital image of the biological tissue is a digital whole slide imaging (WSI), which may be a HE staining image of a pre-treatment colonoscopy biopsy specimen. Specifically, a digital pathology image recognition technology may be applied, and a traditional pathology HE staining section may be converted into the WSI via a scanner and a high-resolution microscope. In the art, there is no pathomical method for analyzing the HE staining image of the pre-treatment colonoscopy biopsy specimen. Most of pathomical recognition techniques in the art are based on HE staining images of large specimens after tumor resection. The large specimens can be obtained only after being surgically resected. Therefore, an opportunity and necessity of predicting the immunotherapeutic efficacy are lost. By contrast, the colonoscopy biopsy specimen can be obtained by performing colonoscopy before any therapy, and at this moment, the patient still has an opportunity to choose a therapeutic means. Moreover, a small amount of sampling may be obtained from the colonoscopy biopsy specimen, the colonoscopy biopsy specimen has poor representativeness, tissues may be deformed caused by tearing and pulling during taking the colonoscopy biopsy. Therefore, the recognition method and the recognition characteristics of large specimens may not be directly applied on the colonoscopy biopsy specimen. By performing the above operations, many information not visible to naked eyes may be applied through the pathomics to a specific target to produce highly accurate and reproducible results, such that an efficiency and accuracy of pathology diagnosis may be improved.

Specifically, the immunotherapy refers to the neoadjuvant immunotherapy for the colorectal cancer. Specifically, since the nivolumab was firstly used for tumor treatment in 2006, the PD-1 antibody and other related immunotherapies have become increasingly popular and have become another effective means for treating malignant tumors after surgeries, chemotherapies, radiotherapies, targeted therapies and other therapies. Treatment strategies for many types of cancers, including the lung cancer, the stomach cancer, and the breast cancer, have been changed. In many guidelines, including National Comprehensive Cancer Network (NCCN) guidelines and Chinese Society of Clinical Oncology (CSCO) guidelines, the pembrolizumab, as a representative, occupies an important place for treating dMMR/MSI-H colorectal cancer patients. The neoadjuvant immunotherapy refers to applying the immunotherapy on patients without distant metastases before being subject to surgeries, in order to achieve tumor regression or even complete remission of the tumor, eliminating necessity for being subject to the surgeries. Although the immunotherapy efficacy is remarkable, there are still some patients who cannot benefit from the immunotherapy. Therefore, predicting colorectal cancer patients who can benefit from the immunotherapy at an early stage is a clinically valuable scientific problem.

Specifically, the technical solution in the present disclosure focuses on identifying microenvironmental features in the biological tissue when calculating the cellular feature parameter. Specifically, according to studies, variability of the colorectal cancer can be reflected by a microenvironment in a number of ways. At a tissue level, in addition to a tumor epithelial region, various tissue regions, such as a tumor mesenchymal region, a mucus region, and a tumor necrotic region, may have an important impact on prognosis of the colorectal cancer patient. At a cellular level, immune cells, including tumor-infiltrating lymphocytes (TILs), plasma cells, neutrophils, and so on, are important in an anti-tumor immune response, and the immune cells and other cell types in the tumor region cooperatively form an immune microenvironment.

Therefore, according to the above embodiment of the present disclosure, the tissue type and the cell type corresponding to the digital image of the biological tissue are firstly determined by means of the classifier algorithm. Subsequently, the plurality of cell feature parameters are determined based on corresponding feature calculation rules, and scoring is performed. In this way, the score that characterizes the therapeutic efficacy is obtained. The accuracy and the efficiency of predicting the therapeutic efficacy of the colorectal cancer are effectively improved, prediction costs are reduced, and accurate data basis is provided for subsequent treatments or research.

In an embodiment, the operation of predicting the tissue type parameter and the cell type parameter corresponding to the digital image of the biological tissue based on the classifier algorithm model, includes following operations.

The digital image of the biological tissue is input into a trained tissue region recognition algorithm model, so as to obtain a plurality of tissue regions corresponding to the digital image of the biological tissue and obtain a tissue type corresponding each of the plurality of tissue regions.

The digital image of the biological tissue is input into a trained cell recognition algorithm model, so as to obtain a plurality of cell regions corresponding to the digital image of the biological tissue and obtain a cell type corresponding to each of the plurality of cell regions.

In some embodiments, the tissue region recognition algorithm model can classify various regions in the digital image of the biological tissue into at least two types, which are a mucus constituent type and a tumor region type. A feature encoding model structure is a Densenet architecture, which is trained by a training dataset including a plurality of training images and corresponding annotations of biological tissue types.

In some embodiments, the cell recognition algorithm model can classify various regions in the digital image of the biological tissue into six cell types, which include tumor epithelial cells, tumor stromal cells, lymphocytes, plasma cells, neutrophils, eosinophils, and so on. The cell recognition model is trained by using a publicly available training dataset (the Lizard dataset). The Lizard dataset is widely used for constructing this type of colorectal cell recognition model. The Lizard dataset includes histological image regions of colorectal tissues from six different dataset sources, which are accompanied with nuclear-like markers for epithelial cells, stromal cells, lymphocytes, plasma cells, neutrophils, and eosinophils, such that a tumor immune microenvironment can be effectively characterized. The Lizard dataset is randomly divided into a training dataset and a validation dataset in a ratio of 8:2. An FCN neural network is used as a model architecture for constructing the cell recognition algorithm model.

Therefore, according to the above embodiment of the present disclosure, the tissue type and the cell type corresponding to the digital image of the biological tissue are firstly determined by means of the classifier algorithm. Subsequently, the plurality of cell feature parameters are determined based on corresponding feature calculation rules, and scoring is performed. In this way, the score that characterizes the therapeutic efficacy is obtained. The accuracy and the efficiency of predicting the therapeutic efficacy of the colorectal cancer are effectively improved, prediction costs are reduced, and accurate data basis is provided for subsequent treatments or research.

In an embodiment, the operation of determining the plurality of cell feature parameters corresponding to the digital image of the biological tissue based on the calculating rule of the plurality of cell features corresponding to the tissue type parameter and the cell type parameter, includes following operations.

The number of tissue regions each having the mucus constituent type as the tissue type is calculated.

A ratio of the number of the tissue regions (each having the mucus constituent type as the tissue type) to the total number of all the plurality of tissue regions is calculated, so as to obtain a mucus region ratio parameter.

Therefore, according to the above embodiment, the mucus region ratio parameter can be obtained by calculating the ratio of the number of tissue regions, each having the mucus constituent type as the tissue type, to the total number of tissue regions. In this way, mucus conditions in the tissues can be effectively assessed, such that the therapeutic efficacy score can be subsequently calculated based on the mucus conditions, thereby assisting in improving the accuracy and the efficiency of predicting the therapeutic efficacy for the colorectal cancer, reducing the prediction costs, and providing the accurate data basis for subsequent treatments or research.

In an embodiment, the operation of determining the plurality of cell feature parameters corresponding to the digital image of the biological tissue based on the calculating rule of the plurality of cell features corresponding to the tissue type parameter and the cell type parameter, includes following operations.

Tissue regions, each having a tumor type as the tissue type, are screened, so as to obtain a plurality of tumor tissue regions.

A minimum outer polygon of the plurality of tumor tissue regions is calculated, so as to obtain a tumor combination region.

The tumor combination region is divided into a plurality of sub-regions, and for each of the plurality of sub-regions, following operations are performed.

In the sub-region, the number of cell regions, each having the lymphocyte as the cell type, is calculated, so as to obtain the number of lymphocytes.

In the sub-region, the number of cell regions, each having the tumor cell as the cell type, is calculated, so as to obtain the number of tumor cells.

A ratio of the number of lymphocytes to a first total number of cells is calculated, so as to obtain a lymphocyte percentage. In some embodiments, the first total number of cells is a sum of the number of lymphocytes and the number of tumor cells.

A ratio of the number of tumor cells to the total number of cells is calculated, so as to obtain a tumor cell percentage.

A lymphocyte abundance parameter corresponding to the tumor combination region is calculated, based on the lymphocyte percentage and the tumor cell percentage corresponding to each of the plurality of sub-regions and based on a co-localization coefficient algorithm.

Specifically, dividing the tumor combination region into the plurality of sub-regions may achieved by dividing the tumor combination region into a plurality of 0.5 mm*0.5 mm square regions, and the cell parameter in each of the plurality of 0.5 mm*0.5 mm square regions is calculated.

Specifically, the operation of calculating the lymphocyte abundance parameter corresponding to the tumor combination region, based on the lymphocyte percentage and the tumor cell percentage corresponding to each of the plurality of sub-regions and based on a co-localization coefficient algorithm, includes following operations.

For each of the plurality of sub-regions, a product of the lymphocyte percentage and the tumor cell percentage is calculated, so as to obtain a first parameter.

A value of two times of a sum of first parameters of all of the plurality of sub-regions is calculated, so as to obtain a second parameter.

A sum of squared values of lymphocyte percentages of all of the plurality of sub-regions is calculated, so as to obtain a third parameter.

A sum of squared values of tumor cell percentages of all of the plurality of sub-regions is calculated, so as to obtain a fourth parameter.

A sum of the third parameter and the fourth parameter is calculated, so as to obtain a fifth parameter.

A ratio of the second parameter to the fifth parameter is calculated, so as to obtain the co-localization scoring parameter.

A ratio of the co-localization scoring parameter to 2 is calculated, so as to obtain a sixth parameter.

A sum of lymphocyte percentages of all of the plurality of sub-regions is calculated, so as to obtain a seventh parameter.

A sum of tumor cell percentages of all of the plurality of sub-regions is calculated, so as to obtain an eighth parameter.

A ratio of the seventh parameter to the eighth parameter is calculated, so as to obtain a ninth parameter.

A product of the sixth parameter and the ninth parameter is calculated, so as to obtain the lymphocyte abundance parameter corresponding to the tumor combination region.

Therefore, according to the above embodiment, the lymphocyte abundance parameter can be obtained by dividing the tissue region in the tumor type into the plurality of sub-regions and by performing co-localization calculation on the number of lymphocytes and the number of tumor cells. In this way, lymphocyte abundance in the tissue can be effectively assessed, such that the therapeutic efficacy score can be subsequently calculated based on the lymphocyte abundance, thereby assisting in improving the accuracy and the efficiency of predicting the therapeutic efficacy for the colorectal cancer, reducing the prediction costs, and providing the accurate data basis for subsequent treatments or research.

In an embodiment, the operation of determining the plurality of cell feature parameters corresponding to the digital image of the biological tissue based on the calculating rule of the plurality of cell features corresponding to the tissue type parameter and the cell type parameter, includes following operations.

In each of the plurality of sub-regions, the number of cell regions, each having a plasma cell as the cell type, is calculated so as to obtain the number of plasma cells.

In each of the plurality of sub-regions, a ratio of the number of plasma cells to the second total number of cells is calculated, so as to obtain a plasma cell percentage in each of the plurality of sub-regions. In some embodiments, the second total number of cells is a sum of the number of plasma cells and the number of tumor cells.

A plasma cell co-localization parameter corresponding to the tumor combination region is calculated, based on the plasma cell percentage and the tumor cell percentage in each of the plurality of sub-regions and based on the co-localization coefficient algorithm.

Specifically, calculating the plasma cell co-localization parameter corresponding to the tumor combination region, based on the plasma cell percentage and the tumor cell percentage in each of the plurality of sub-regions and based on the co-localization coefficient algorithm, includes following operations.

For each of the plurality of sub-regions, a product of the plasma cell percentage and the tumor cell percentage is calculated, so as to obtain a tenth parameter.

A value of two times of a sum of tenth parameters of all of the plurality of sub-regions is calculated, so as to obtain an eleventh parameter.

A sum of squared values of plasma cell percentages of all of the plurality of sub-regions is calculated, so as to obtain a twelfth parameter.

A sum of the twelfth parameter and the fourth parameter is calculated, so as to obtain a thirteenth parameter.

A ratio of the eleventh parameter to the thirteenth parameter is calculated, so as to obtain the plasma cell co-localization parameter corresponding to the tumor combination region.

Calculation of the fourth parameter is described in the above embodiment, and will not be repeated herein.

Therefore, according to the above embodiment, by calculating co-localization of the number of plasma cells and the number of tumor cells in the tissue region of the tumor type, the plasma cell co-localization parameter is obtained. In this way, plasma cell conditions in the tissue can be effectively assessed, such that the therapeutic efficacy score can be subsequently calculated based on the plasma cell conditions, thereby assisting in improving the accuracy and the efficiency of predicting the therapeutic efficacy for the colorectal cancer, reducing the prediction costs, and providing the accurate data basis for subsequent treatments or research.

In an embodiment, the operation of determining the plurality of cell feature parameters corresponding to the digital image of the biological tissue based on the calculating rule of the plurality of cell features corresponding to the tissue type parameter and the cell type parameter, includes following operations.

In each of the plurality of sub-regions, the number of cell regions, each having a neutrophil as the cell type, is calculated so as to obtain the number of neutrophils.

In each of the plurality of sub-regions, a ratio of the number of neutrophils to the third total number of cells is calculated, so as to obtain a neutrophil percentage in each of the plurality of sub-regions. In some embodiments, the third total number of cells is a sum of the number of neutrophils and the number of tumor cells.

A neutrophil co-localization parameter corresponding to the tumor combination region is calculated, based on the neutrophil percentage and the tumor cell percentage in each of the plurality of sub-regions and based on the co-localization coefficient algorithm.

Specifically, calculating the neutrophil co-localization parameter corresponding to the tumor combination region, based on the neutrophil percentage and the tumor cell percentage in each of the plurality of sub-regions and based on the co-localization coefficient algorithm, includes following operations.

For each of the plurality of sub-regions, a product of the neutrophil percentage and the tumor cell percentage is calculated, so as to obtain a fourteenth parameter.

A value of two times of a sum of fourteenth parameters of all of the plurality of sub-regions is calculated, so as to obtain a fifteenth parameter.

A sum of squared values of neutrophil percentages of all of the plurality of sub-regions is calculated, so as to obtain a sixteenth parameter.

A sum of the sixteenth parameter and the fourth parameter is calculated, so as to obtain a seventeenth parameter.

A ratio of the fifteenth parameter to the seventeenth parameter is calculated, so as to obtain the neutrophil co-localization parameter corresponding to the tumor combination region.

Calculation of the fourth parameter is described in the above embodiment, and will not be repeated herein.

Therefore, according to the above embodiment, by calculating co-localization of the number of neutrophils and the number of tumor cells in the tissue region of the tumor type, the neutrophil co-localization parameter is obtained. In this way, neutrophil conditions in the tissue can be effectively assessed, such that the therapeutic efficacy score can be subsequently calculated based on the neutrophil conditions, thereby assisting in improving the accuracy and the efficiency of predicting the therapeutic efficacy for the colorectal cancer, reducing the prediction costs, and providing the accurate data basis for subsequent treatments or research.

In an embodiment, the operation of calculating the therapeutic efficacy score corresponding to the colorectal cancer patient according to the plurality of cell feature parameters and the predetermined parameter scoring rule, includes following operations.

A first effect score corresponding to the mucus region ratio parameter is calculated. In some embodiment, the first effect score is inversely proportional to the mucus region ratio parameter.

A second effect score corresponding to the lymphocyte abundance parameter, a second effect score corresponding to the plasma cell co-localization parameter, and a second effect score corresponding to the neutrophil co-localization parameter are calculated. In some embodiments, the second effect score corresponding to the lymphocyte abundance parameter is positively proportional to the lymphocyte abundance parameter. The second effect score corresponding to the plasma cell co-localization parameter is positively proportional to the plasma cell co-localization parameter. The second effect score corresponding to the neutrophil co-localization parameter is positively proportional to the neutrophil co-localization parameter.

A sum of the first effect score, the second effect score corresponding to the lymphocyte abundance parameter, the second effect score corresponding to the plasma cell co-localization parameter, and the second effect score corresponding to the neutrophil co-localization parameter is calculated to obtain the therapeutic efficacy score corresponding to the colorectal cancer patient.

In an embodiment, a score is assigned for each feature parameter based on quartiles of each feature parameter respectively. For one feature parameter that is favorable to the therapy, as the value of the feature parameter is higher, the score of the feature parameter is higher. For example, when the value of one feature parameter is higher than 75%, the score of the feature parameter is 1; and when the value of the feature parameter is lower than 25%, the score of the feature parameter is −1. When the value of the feature parameter is between 25% and the 75%, the score of the feature parameter is 0. For one feature parameter that is unfavorable to the therapy, as the value of the feature parameter is higher, the score of the feature parameter is lower. For example, when the value of one feature parameter is higher than 75%, the score of the feature parameter is −1; and when the value of the feature parameter is lower than 25%, the score of the feature parameter is 1. When the value of the feature parameter is between 25% and the 75%, the score of the feature parameter is 0. In an example, a scoring scheme is as follows.

When the mucus region ratio parameter <0.01224769, the score is 1, and when the mucus region ratio parameter >0.053930183, the score is −1.

When the lymphocyte abundance parameter <0.040537723, the score is −1, and when the lymphocyte abundance parameter >0.170647716, the score is 1.

When the plasma cell co-localization parameter <0.084856712, the score is −1, and when the plasma cell co-localization parameter >0.199756568, the score is 1.

When the neutrophil co-localization parameter <0.037376427, the score is −1, and when the neutrophil co-localization parameter >0.085987609, the score is 1.

At last, a sum all scores of all feature parameters is calculated to obtain the therapeutic efficacy score corresponding to the pathomical immunological microenvironment. A corresponding scoring scheme may be as follows. A score of 1, 2, 3, or 4 would be assessed as an immunologically hot tumor. A score of −1 or 0 would be assessed as an immunologically moderate tumor. A score of −4, −3, or −2 would be assessed as an immunologically cold tumor. These scores can be used to predict, independently from the MMR/MSI status, the immunotherapy efficacy, and as the score is higher, it is more pronounced for the patient to benefit from the immunotherapy.

In a study applying the above embodiment, 17 patients in a dMMR modeling cohort, 17 patients in a dMMR retrospective cohort, and 11 patients in a dMMR prospective cohort are identified as having immunologically hot tumors. All 45 (35.4%) patients with the immunologically hot tumors achieve complete remission after being subject to the neoadjuvant immunotherapy. According to previous studies, colorectal cancer patients who achieve clinically complete remission from the immunotherapy may receive clinical observation without being subject to surgeries, and no recurrent metastatic events are detected during 2-year follow-up. Therefore, it is suggested that the model of the present disclosure is expected to be used to screen a special group of dMMR colorectal cancer patients who is accounted for about one-third of all patients and can achieve complete remission by receiving the neoadjuvant immunotherapy, exempting from a surgical treatment and achieving organ preservation.

On the other hand, 47 pMMR patients are included in the study. Surprisingly, the model, which is established based on the dMMR patients, showed equally ideal predictive efficacy in the pMMR patients. A total of 12 pMMR (25.5%) patients are identified as having the immunologically hot tumors. A CR rate thereof reaches 57.1%, which is significantly higher than that of patients with the immunologically moderate tumors and patents with the immunologically cold tumors. An ORR rate thereof reaches 81.0%, which is higher than 46.2% for the patients with the immunologically cold tumors. However, a statistical difference is not reached due to a small sample size. To be noted that, in the art, a preferred neoadjuvant therapy for pMMR locally advanced colorectal cancer is neoadjuvant chemotherapy. According to OPTICAL study results, a CR rate thereof is only 7%, and only 20% of the patients have a postoperative pathology stage reduced to reach a stage 0 to I. In the art, the preferred neoadjuvant therapy for the locally advanced rectal cancer patients is TNT treatment. According to the PRODIGE 23 study, a CR rate thereof is only 27.5%. Therefore, in the present disclosure, the CR rate of 57.1% and the ORR rate of 81.0% for the immunologically hot tumor group are significantly better than the preferred neoadjuvant regimen for the pMMR colorectal cancer patients in the art. It is suggested that the present disclosure may be applied to screen a specific group of patients, who is accounted for approximately one quarter of all pMMR patients and can achieve superior short-term outcomes by receiving the neoadjuvant immunotherapy.

Therefore, according to the above embodiment, by calculating the effect score corresponding to each of the plurality of cell feature parameters and by calculating the sum of all effect scores of all of the plurality of cell feature parameters, the therapy efficacy score for predicting the immunotherapy efficacy when the patient receiving the immunotherapy is obtained. In this way, the accuracy and the efficiency of predicting the therapeutic efficacy for the colorectal cancer is improved, the prediction costs are reduced, and the accurate data basis are provided for subsequent treatments or research.

In an embodiment, the operation of calculating the sum of the first effect score, the second effect score corresponding to the lymphocyte abundance parameter, the second effect score corresponding to the plasma cell co-localization parameter, and the second effect score corresponding to the neutrophil co-localization parameter, so as to obtain the therapeutic efficacy score corresponding to the colorectal cancer patient, includes following operations.

A weighted summed average of the first effect score, the second effect score corresponding to the lymphocyte abundance parameter, the second effect score corresponding to the plasma cell co-localization parameter, and the second effect score corresponding to the neutrophil co-localization parameter, is calculated to obtain the therapeutic efficacy score corresponding to the colorectal cancer patient. A weight of the first effect score is positively proportional to a total area of all of the tissue regions each having the mucus constituent type as the tissue type. A weight of the second effect score corresponding to the lymphocyte abundance parameter is positively proportional to a total area of all of the cell regions each having the lymphocyte as the cell type. A weight of the second effect score corresponding to the plasma cell co-localization parameter is positively proportional to a total area of all of the cell regions each having the plasma cell as the cell type. A weight of the second effect score corresponding to the neutrophil co-localization parameter is positively proportional to a total area of all of the cell regions each having the neutrophil as the cell type.

Specifically, in the above embodiment, calculation of weights of areas of the regions is introduced, such that the therapeutic efficacy score obtained by performing weighted summation effectively considers the extent of an influence of the area of each region on calculating the parameter value, such that the finally obtained score is more explicit and clearer, better characterizing the predicted therapy efficacy of the patient.

Therefore, according to the above embodiment, by performing weighted summation on effect scores corresponding to the plurality of cell feature parameters based on weighting rules associated with the areas of the regions, the therapy efficacy score for predicting the immunotherapy efficacy when the patient receiving the immunotherapy is more accurate. In this way, the accuracy and the efficiency of predicting the therapeutic efficacy for the colorectal cancer is improved, the prediction costs are reduced, and the accurate data basis are provided for subsequent treatments or research.

Embodiment II

Figure 2:
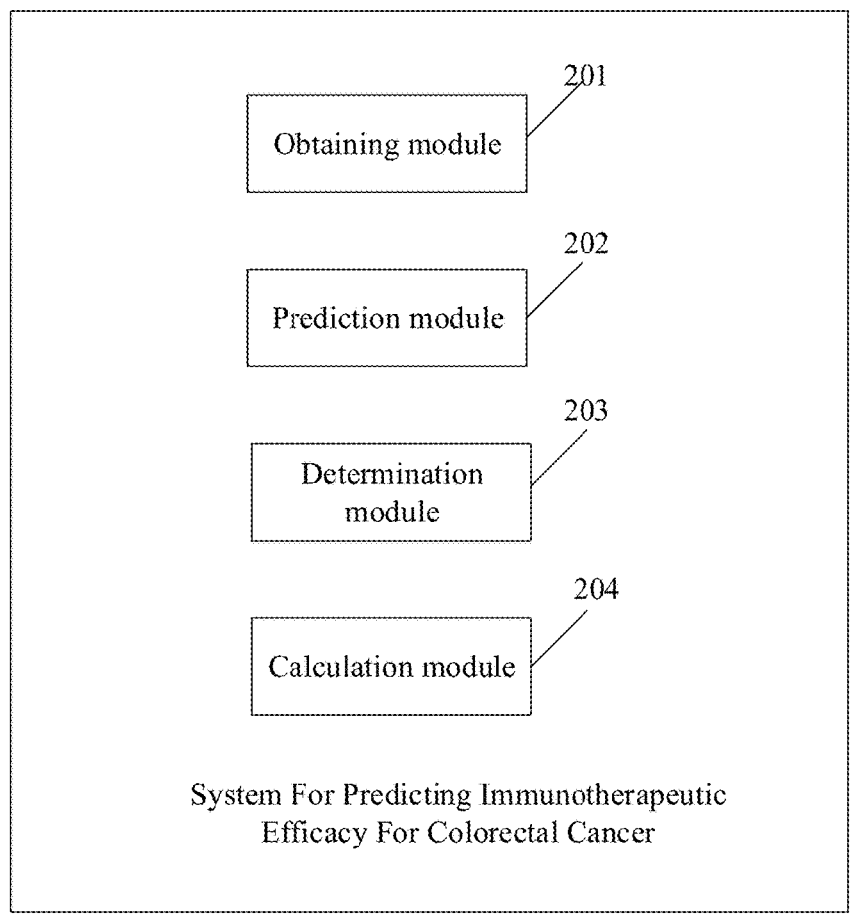
FIG. 2 is a structural schematic diagram of a system for predicting the therapeutic efficacy for the colorectal cancer according to some embodiments of the present disclosure.

As shown in FIG. 2, FIG. 2 is a structural schematic diagram of a system for predicting the therapeutic efficacy for the colorectal cancer according to some embodiments of the present disclosure. The system for predicting the therapeutic efficacy for the colorectal cancer shown in FIG. 2 may be applied in the data processing system/the data processing device/the data processing server (the server includes the local processing server or the cloud processing server). As shown in FIG. 2, the system for predicting the therapeutic efficacy for the colorectal cancer may include the following components.

An obtaining module 201 is configured to obtain the digital image of the biological tissue of the colorectal cancer patient.

A prediction module 202 is configured to predict, based on the classifier algorithm model, the tissue type parameter and the cell type parameter corresponding to the digital image of the biological tissue.

A determination module 203 is configured to determine, based on the calculating rule of the plurality of cell features corresponding to the tissue type parameter and the cell type parameter, the plurality of cell feature parameters corresponding to the digital image of the biological tissue.

A calculation module 204 is configured to calculate, according to the plurality of cell feature parameters and the predetermined parameter scoring rule, the therapeutic efficacy score corresponding to the colorectal cancer patient.

In some embodiments, the therapeutic efficacy score is configured to predict the therapeutic efficacy of the colorectal cancer patient receiving immunotherapy.

Therefore, according to the above embodiment of the present disclosure, the tissue type and the cell type corresponding to the digital image of the biological tissue are firstly determined by means of the classifier algorithm. Subsequently, the plurality of cell feature parameters are determined based on corresponding feature calculation rules, and scoring is performed. In this way, the score that characterizes the therapeutic efficacy is obtained. The accuracy and the efficiency of predicting the therapeutic efficacy of the colorectal cancer are effectively improved, prediction costs are reduced, and accurate data basis is provided for subsequent treatments or research.

In an embodiment, the prediction module predicting the tissue type parameter and the cell type parameter corresponding to the digital image of the biological tissue based on the classifier algorithm model, is achieved via following implementations.

The digital image of the biological tissue is input into a trained tissue region recognition algorithm model, so as to obtain a plurality of tissue regions corresponding to the digital image of the biological tissue and obtain a tissue type corresponding each of the plurality of tissue regions.

The digital image of the biological tissue is input into a trained cell recognition algorithm model, so as to obtain a plurality of cell regions corresponding to the digital image of the biological tissue and obtain a cell type corresponding to each of the plurality of cell regions.

Therefore, according to the above embodiment of the present disclosure, the tissue type and the cell type corresponding to the digital image of the biological tissue are firstly determined by means of the classifier algorithm. Subsequently, the plurality of cell feature parameters are determined based on corresponding feature calculation rules, and scoring is performed. In this way, the score that characterizes the therapeutic efficacy is obtained. The accuracy and the efficiency of predicting the therapeutic efficacy of the colorectal cancer are effectively improved, prediction costs are reduced, and accurate data basis is provided for subsequent treatments or research.

In an embodiment, the determination module determining the plurality of cell feature parameters corresponding to the digital image of the biological tissue based on the calculating rule of the plurality of cell features corresponding to the tissue type parameter and the cell type parameter, is achieved via following implementations.

The number of tissue regions each having the mucus constituent type as the tissue type is calculated.

The ratio of the number of the tissue regions (each having the mucus constituent type as the tissue type) to the total number of all of the plurality of tissue regions is calculated, so as to obtain a mucus region ratio parameter.

Therefore, according to the above embodiment, the mucus region ratio parameter can be obtained by calculating the ratio of the number of tissue regions, each having the mucus constituent type as the tissue type, to the total number of tissue regions. In this way, mucus conditions in the tissues can be effectively assessed, such that the therapeutic efficacy score can be subsequently calculated based on the mucus conditions, thereby assisting in improving the accuracy and the efficiency of predicting the therapeutic efficacy for the colorectal cancer, reducing the prediction costs, and providing the accurate data basis for subsequent treatments or research.

In an embodiment, the determination module determining the plurality of cell feature parameters corresponding to the digital image of the biological tissue based on the calculating rule of the plurality of cell features corresponding to the tissue type parameter and the cell type parameter, is achieved via following implementations.

Tissue regions, each having a tumor type as the tissue type, are screened, so as to obtain the plurality of tumor tissue regions.

The minimum outer polygon of the plurality of tumor tissue regions is calculated, so as to obtain the tumor combination region.

The tumor combination region is divided into the plurality of sub-regions, and for each of the plurality of sub-regions, following operations are performed.

In the sub-region, the number of cell regions, each having the lymphocyte as the cell type, is calculated, so as to obtain the number of lymphocytes.

In the sub-region, the number of cell regions, each having the tumor cell as the cell type, is calculated, so as to obtain the number of tumor cells.

The ratio of the number of lymphocytes to a first total number of cells is calculated, so as to obtain a lymphocyte percentage. In some embodiments, the first total number of cells is a sum of the number of lymphocytes and the number of tumor cells.

The ratio of the number of tumor cells to the total number of cells is calculated, so as to obtain a tumor cell percentage.

The lymphocyte abundance parameter corresponding to the tumor combination region is calculated, based on the lymphocyte percentage and the tumor cell percentage corresponding to each of the plurality of sub-regions and based on a co-localization coefficient algorithm.

Therefore, according to the above embodiment, the lymphocyte abundance parameter can be obtained by dividing the tissue region in the tumor type into the plurality of sub-regions and by performing co-localization calculation on the number of lymphocytes and the number of tumor cells. In this way, lymphocyte abundance in the tissue can be effectively assessed, such that the therapeutic efficacy score can be subsequently calculated based on the lymphocyte abundance, thereby assisting in improving the accuracy and the efficiency of predicting the therapeutic efficacy for the colorectal cancer, reducing the prediction costs, and providing the accurate data basis for subsequent treatments or research.

In an embodiment, determining the plurality of cell feature parameters corresponding to the digital image of the biological tissue based on the calculating rule of the plurality of cell features corresponding to the tissue type parameter and the cell type parameter, includes following operations.

In each of the plurality of sub-regions, the number of cell regions, each having a plasma cell as the cell type, is calculated so as to obtain the number of plasma cells.

In each of the plurality of sub-regions, a ratio of the number of plasma cells to the second total number of cells is calculated, so as to obtain a plasma cell percentage in each of the plurality of sub-regions. In some embodiments, the second total number of cells is a sum of the number of plasma cells and the number of tumor cells.

The plasma cell co-localization parameter corresponding to the tumor combination region is calculated, based on the plasma cell percentage and the tumor cell percentage in each of the plurality of sub-regions and based on the co-localization coefficient algorithm.

Therefore, according to the above embodiment, by calculating co-localization of the number of plasma cells and the number of tumor cells in the tissue region of the tumor type, the plasma cell co-localization parameter is obtained. In this way, plasma cell conditions in the tissue can be effectively assessed, such that the therapeutic efficacy score can be subsequently calculated based on the plasma cell conditions, thereby assisting in improving the accuracy and the efficiency of predicting the therapeutic efficacy for the colorectal cancer, reducing the prediction costs, and providing the accurate data basis for subsequent treatments or research.

In an embodiment, determining the plurality of cell feature parameters corresponding to the digital image of the biological tissue based on the calculating rule of the plurality of cell features corresponding to the tissue type parameter and the cell type parameter, includes following operations.

In each of the plurality of sub-regions, the number of cell regions, each having a neutrophil as the cell type, is calculated so as to obtain the number of neutrophils.

In each of the plurality of sub-regions, a ratio of the number of neutrophils to the third total number of cells is calculated, so as to obtain a neutrophil percentage in each of the plurality of sub-regions. In some embodiments, the third total number of cells is a sum of the number of neutrophils and the number of tumor cells.

The neutrophil co-localization parameter corresponding to the tumor combination region is calculated, based on the neutrophil percentage and the tumor cell percentage in each of the plurality of sub-regions and based on the co-localization coefficient algorithm.

Therefore, according to the above embodiment, by calculating co-localization of the number of neutrophils and the number of tumor cells in the tissue region of the tumor type, the neutrophil co-localization parameter is obtained. In this way, neutrophil conditions in the tissue can be effectively assessed, such that the therapeutic efficacy score can be subsequently calculated based on the neutrophil conditions, thereby assisting in improving the accuracy and the efficiency of predicting the therapeutic efficacy for the colorectal cancer, reducing the prediction costs, and providing the accurate data basis for subsequent treatments or research.

In an embodiment, calculating the therapeutic efficacy score corresponding to the colorectal cancer patient according to the plurality of cell feature parameters and the predetermined parameter scoring rule, includes following operations.

The first effect score corresponding to the mucus region ratio parameter is calculated. In some embodiment, the first effect score is inversely proportional to the mucus region ratio parameter.

The second effect score corresponding to the lymphocyte abundance parameter, a second effect score corresponding to the plasma cell co-localization parameter, and a second effect score corresponding to the neutrophil co-localization parameter are calculated. In some embodiments, the second effect score corresponding to the lymphocyte abundance parameter is positively proportional to the lymphocyte abundance parameter. The second effect score corresponding to the plasma cell co-localization parameter is positively proportional to the plasma cell co-localization parameter. The second effect score corresponding to the neutrophil co-localization parameter is positively proportional to the neutrophil co-localization parameter.

A sum of the first effect score, the second effect score corresponding to the lymphocyte abundance parameter, the second effect score corresponding to the plasma cell co-localization parameter, and the second effect score corresponding to the neutrophil co-localization parameter is calculated to obtain the therapeutic efficacy score corresponding to the colorectal cancer patient.

Therefore, according to the above embodiment, by calculating the effect score corresponding to each of the plurality of cell feature parameters and by calculating the sum of all effect scores of all of the plurality of cell feature parameters, the therapy efficacy score for predicting the immunotherapy efficacy when the patient receiving the immunotherapy is obtained. In this way, the accuracy and the efficiency of predicting the therapeutic efficacy for the colorectal cancer is improved, the prediction costs are reduced, and the accurate data basis are provided for subsequent treatments or research.

In an embodiment, calculating the sum of the first effect score, the second effect score corresponding to the lymphocyte abundance parameter, the second effect score corresponding to the plasma cell co-localization parameter, and the second effect score corresponding to the neutrophil co-localization parameter, so as to obtain the therapeutic efficacy score corresponding to the colorectal cancer patient, includes following operations.

A weighted summed average of the first effect score, the second effect score corresponding to the lymphocyte abundance parameter, the second effect score corresponding to the plasma cell co-localization parameter, and the second effect score corresponding to the neutrophil co-localization parameter, is calculated to obtain the therapeutic efficacy score corresponding to the colorectal cancer patient. A weight of the first effect score is positively proportional to a total area of all of the tissue regions each having the mucus constituent type as the tissue type. A weight of the second effect score corresponding to the lymphocyte abundance parameter is positively proportional to a total area of all of the cell regions each having the lymphocyte as the cell type. A weight of the second effect score corresponding to the plasma cell co-localization parameter is positively proportional to a total area of all of the cell regions each having the plasma cell as the cell type. A weight of the second effect score corresponding to the neutrophil co-localization parameter is positively proportional to a total area of all of the cell regions each having the neutrophil as the cell type.

Therefore, according to the above embodiment, by performing weighted summation on effect scores corresponding to the plurality of cell feature parameters based on weighting rules associated with the areas of the regions, the therapy efficacy score for predicting the immunotherapy efficacy when the patient receiving the immunotherapy is more accurate. In this way, the accuracy and the efficiency of predicting the therapeutic efficacy for the colorectal cancer is improved, the prediction costs are reduced, and the accurate data basis are provided for subsequent treatments or research.

Embodiment III

Figure 3:
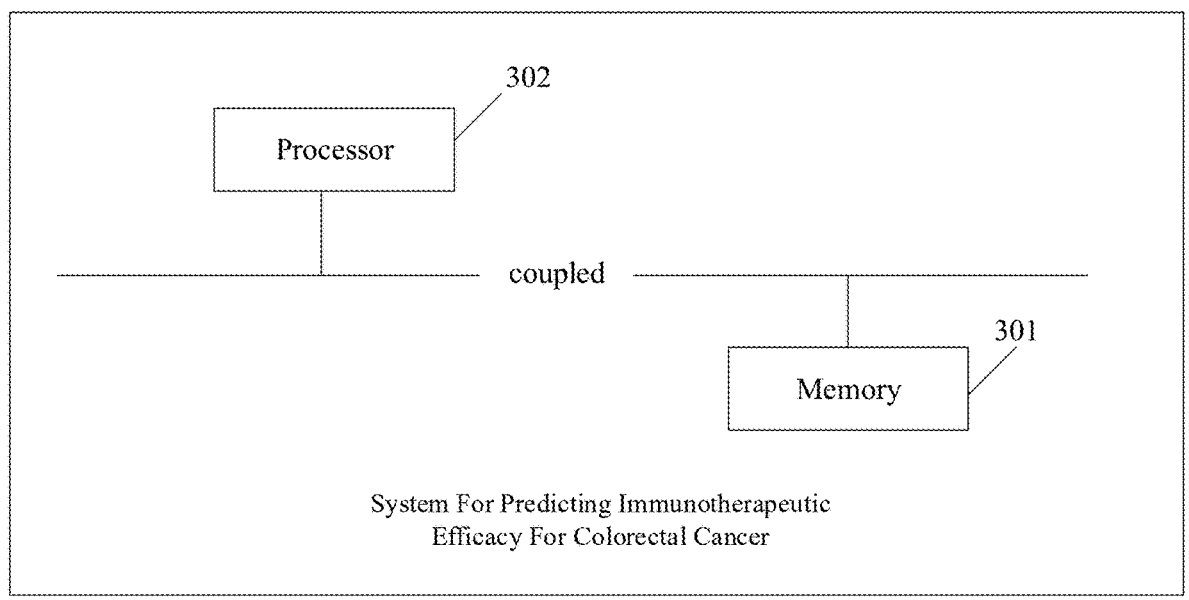
FIG. 3 is a structural schematic diagram of another system for predicting the therapeutic efficacy for the colorectal cancer according to some embodiments of the present disclosure.

As shown in FIG. 3, FIG. 3 is a structural schematic diagram of another system for predicting the therapeutic efficacy for the colorectal cancer according to some embodiments of the present disclosure. The system for predicting the therapeutic efficacy for the colorectal cancer shown in FIG. 3 may be applied in the data processing system/the data processing device/the data processing server (the server includes the local processing server or the cloud processing server). As shown in FIG. 3, the system for predicting the therapeutic efficacy for the colorectal cancer may include the following components.

A memory 301 stores executable program codes.

A processor 302 is connected to the memory 301.

The processor 302 invokes the executable program codes stored in the memory 301 to execute the operations of the method for predicting the immunotherapeutic efficacy for the colorectal cancer as described in the Embodiment I.

Embodiment IV

The present embodiment provides a computer-readable storage medium storing a computer program for electric data interchange. The computer program causes a computer to perform the operations of the method for predicting the immunotherapeutic efficacy for the colorectal cancer as described in the Embodiment I.

Embodiment V

The present embodiment provides a computer program product including a non-transitory computer-readable storage medium that stores a computer program. The computer program is operable to cause a computer to perform the operations of the method for predicting the immunotherapeutic efficacy for the colorectal cancer as described in the Embodiment I.

Specific embodiments of the present disclosure are described in the above above, and other embodiments are within the scope of the appended claims. In some cases, actions or operations recited in the claims may be performed in an order different from an order described in the above embodiments, and desired results can still be achieved. In addition, operations shown in the accompanying drawings do not necessarily have to be performed in a particular order or performed consecutively to achieve the desired results. In some embodiments, multitasking and parallel processing may also be possible or may be advantageous.

The systems, the device, the modules, or the units described in the above embodiments may specifically be implemented as a computer chip or an entity, or implemented by a product having certain functionality. An exemplary implementation device is a computer. Specifically, the computer may be, for example, a personal computer, a laptop computer, a cellular telephone, a camera phone, a smart phone, a personal digital assistant, a media player, a navigation device, an email device, a game console, a tablet computer, a wearable device, or a combination of any of these devices.

In order to provide convenient description, the device is described in terms of various units based on functions. Of course, the functions of the various units may be implemented in one same or more software and/or hardware when implementing the present disclosure.

Any ordinary skilled person in the art shall understand that the embodiments of the present disclosure may be provided as a method, a system, or a computer program product. Therefore, the embodiments of the present disclosure may be in a form of fully hardware, a form of fully software, or in a form of combination of software and hardware. Moreover, the embodiments of the present disclosure may be in a form of a computer program product implemented on one or more computer-usable storage media (including, but not limited to, a disk memory, CD-ROM, an optical memory, and so on) containing computer-usable program codes therein.

The present specification is described with reference to the flow chart and/or block diagrams of the method, devices (systems), and computer program products according to embodiments of the present specification. It should be understood that each process and/or block in the flow chart and/or the block diagram, and combination of processes and/or blocks in the flow chart and/or the block diagram, may be implemented by computer program instructions. The computer program instructions may be provided to a processor of a general-purpose computer, a special-purpose computer, an embedded processor, or any other programmable data-processing device to produce a machine, such that instructions executed by the processor of the computer or the other programmable data-processing device may produce a device for performing functions specified in one or more processes of the flow chart and/or one or more blocks of the block diagram.

The computer program instructions may alternatively be stored in a computer-readable memory that can direct the computer or the other programmable data processing device to operate in a particular manner, such that the instructions stored in the computer-readable memory produce an article of manufacture including an instruction device that implements the function specified in one or more processes in the flow chart and/or in one or more blocks in the block diagram.

The computer program instructions may alternatively be loaded onto a computer or any other programmable data processing device, such that a series of operations are performed on the computer or the other programmable data processing device to produce computer-implemented processing. In this way, the instructions executed on the computer or the other programmable data processing device provide operations for implementing the functions specified in one or more processes in the flow chart and/or in one or more blocks in the block diagram.

In an exemplary configuration, a computing device includes one or more processors (CPUs), an input/output interface, a network interface, and a memory.

The memory may include a non-permanent memory in a computer-readable medium, a random access memory (RAM) and/or a non-volatile memory, and other forms, such as a read-only memory (ROM) or a flash memory (flash RAM). The memory is an example of a computer readable medium.

The computer-readable medium includes a permanent medium, a non-permanent medium, a movable medium and a non-movable medium, in which information storage may be implemented by any method or technique. The information may be computer-readable instructions, data structures, program modules, or other data. Examples of storage media for computers include, but are not limited to, a phase-change memory (PRAM), a static random-access memory (SRAM), a dynamic random-access memory (DRAM), a random-access memory (RAM) in other types, a read-only memory (ROM), an electrically erasable programmable read-only memory (EEPROM), a flash memory or other memory technologies, a read-only CD-ROM, a digital versatile disc (DVD) or other optical storages, a magnetic cartridge tape, a magnetic tape disk storage or other magnetic storage devices or any other non-transfer medium that can be used to store information to be accessed by the computing device. As defined herein, the computer-readable medium does not include a transitory computer-readable medium, such as modulated data signals and carriers.

To be noted that terms "include", "comprise", or any other variant thereof, are intended to cover non-exclusive inclusion. Therefore, a process, a method, a commodity, or an apparatus including a set of elements includes not only the set of elements but also other elements that are not explicitly listed, or further includes elements that are inherently included in the process, the method, the commodity, or the apparatus. Without further limitation, an element defined by a phrase "includes a . . . " does not preclude existence of another identical element in the process, the method, the commodity or the apparatus in addition to the mentioned element.

The present specification may be described in a general context of computer-executable instructions executed by a computer, such as a program module. Generally, the program module includes routines, procedures, objects, components, data structures, and the like that perform a particular task or implement a particular abstract data type. The present specification may alternatively be practiced in distributed computing environments where tasks are performed by remote processing devices that are connected via a communication network. In the distributed computing environments, the program module may be located in a local computer storage medium and a remote computer storage medium including the storage devices.

Each embodiment in the present specification is described in a progressive manner, identical and similar portions of various embodiments may be referred to each other, and each embodiment focuses on differences from the other embodiments. In particular, the system embodiment is substantially similar to the method embodiment, and therefore, the system embodiment is relatively simply described, and relevant parts of the method embodiment can be referred to.

Finally, it should be noted that, disclosure of the system for predicting the immunotherapy efficacy for the colorectal cancer in the embodiments of the present disclosure shows only preferred embodiments of the present disclosure, and is only used to illustrate technical solutions of the present disclosure, but is not intended limit the present disclosure. Although the present disclosure is described in detail by referring to the above embodiments, it shall be understood by any ordinary skilled person in the art that some of the technical solutions recited in the above embodiments may be modified, or some of the technical features may be replaced with equivalent ones. The modifications or replacements do not cause the essence of the corresponding technical solutions to depart from the spirit and the scope of the technical solutions of the various embodiments of the present disclosure.

What is claimed is:

1. A system for predicting immunotherapeutic efficacy for colorectal cancer, the system comprising:
    a memory, configured to store executable program codes;
    a processor, connected to the memory;
    the processor, configured to invoke the executable program codes stored in the memory to perform a method of predicting the immunotherapeutic efficacy for the colorectal cancer, wherein the method comprises:
    obtaining a digital image of a biological tissue of a colorectal cancer patient;
    predicting, based on a classifier algorithm model, a tissue type parameter and a cell type parameter corresponding to the digital image of the biological tissue;
    determining, based on a calculating rule of a plurality of cell features corresponding to the tissue type parameter and the cell type parameter, a plurality of cell feature parameters corresponding to the digital image of the biological tissue, comprising:
    calculating a number of tissue regions each having a mucus constituent type as the tissue type;
    calculating a ratio of the number of tissue regions to a total number of all of a plurality of tissue regions, so as to obtain a mucus region ratio parameter;
    screening tissue regions, each having a tumor type as the tissue type, so as to obtain a plurality of tumor tissue regions;
    calculating a minimum outer polygon of the plurality of tumor tissue regions, so as to obtain a tumor combination region;
    dividing the tumor combination region into a plurality of sub-regions, and for each of the plurality of sub-regions, calculating a number of cell regions, each having a lymphocyte as the cell type, so as to obtain a number of lymphocytes;

for each of the plurality of sub-regions, calculating a number of cell regions, each having a tumor cell as the cell type, so as to obtain a number of tumor cells;
calculating a ratio of the number of lymphocytes to a first total number of cells, so as to obtain a lymphocyte percentage, wherein the first total number of cells is a sum of the number of lymphocytes and the number of tumor cells;
calculating a ratio of the number of tumor cells to a total number of cells, so as to obtain a tumor cell percentage;
for each of the plurality of sub-regions, calculating a product of the lymphocyte percentage and the tumor cell percentage, so as to obtain a first parameter;
calculating a value of two times of a sum of first parameters of all of the plurality of sub-regions, so as to obtain a second parameter;
calculating a sum of squared values of lymphocyte percentages of all of the plurality of sub-regions, so as to obtain a third parameter;
calculating a sum of squared values of tumor cell percentages of all of the plurality of sub-regions, so as to obtain a fourth parameter;
calculating a sum of the third parameter and the fourth parameter, so as to obtain a fifth parameter;
calculating a ratio of the second parameter to the fifth parameter, so as to obtain a co-localization scoring parameter;
calculating a ratio of the co-localization scoring parameter to 2, so as to obtain a sixth parameter;
calculating a sum of the lymphocyte percentages of all of the plurality of sub-regions, so as to obtain a seventh parameter;
calculating a sum of the tumor cell percentages of all of the plurality of sub-regions, so as to obtain an eighth parameter;
calculating a ratio of the seventh parameter to the eighth parameter, so as to obtain a ninth parameter;
calculating a product of the sixth parameter and the ninth parameter, so as to obtain a lymphocyte abundance parameter corresponding to the tumor combination region;
for each of the plurality of sub-regions, calculating a number of cell regions, each having a plasma cell as the cell type, so as to obtain a number of plasma cells;
for each of the plurality of sub-regions, calculating a ratio of the number of plasma cells to a second total number of cells, so as to obtain a plasma cell percentage in each of the plurality of sub-regions, wherein the second total number of cells is a sum of the number of plasma cells and the number of tumor cells;
calculating a plasma cell co-localization parameter corresponding to the tumor combination region, based on plasma cell percentages and tumor cell percentages of all the plurality of sub-regions and based on the co-localization coefficient algorithm;
for each of the plurality of sub-regions, calculating a number of cell regions, each having a neutrophil as the cell type, so as to obtain a number of neutrophils;
for each of the plurality of sub-regions, calculating a ratio of the number of neutrophils to a third total number of cells, so as to obtain a neutrophil percentage in each of the plurality of
sub-regions, wherein the third total number of cells is a sum of the number of neutrophils and the number of tumor cells;
calculating a neutrophil co-localization parameter corresponding to the tumor combination region, based on neutrophil percentages and the tumor cell percentages in all the plurality of sub-regions and based on the co-localization coefficient algorithm;
calculating a therapeutic efficacy score corresponding to the colorectal cancer patient according to the plurality of cell feature parameters and a predetermined parameter scoring rule, comprising:
calculating a first effect score corresponding to the mucus region ratio parameter, wherein the first effect score is inversely proportional to the mucus region ratio parameter;
calculating a second effect score corresponding to the lymphocyte abundance parameter, a second effect score corresponding to the plasma cell co-localization parameter, and a second effect score corresponding to the neutrophil co-localization parameter; wherein the second effect score corresponding to the lymphocyte abundance parameter is positively proportional to the lymphocyte abundance parameter; the second effect score corresponding to the plasma cell co-localization parameter is positively proportional to the plasma cell co-localization parameter; the second effect score corresponding to the neutrophil co-localization parameter is positively proportional to the neutrophil co-localization parameter; and
calculating a sum of the first effect score, the second effect score corresponding to the lymphocyte abundance parameter, the second effect score corresponding to the plasma cell co-localization parameter, and the second effect score corresponding to the neutrophil co-localization parameter, so as to obtain the therapeutic efficacy score corresponding to the colorectal cancer patient.

2. The system according to claim 1, wherein, the predicting, based on the classifier algorithm model, the tissue type parameter and the cell type parameter corresponding to the digital image of the biological tissue, comprises:
inputting the digital image of the biological tissue into a trained tissue region recognition algorithm model, so as to obtain a plurality of tissue regions corresponding to the digital image of the biological tissue and obtain the tissue type corresponding each of the plurality of tissue regions; and
inputting the digital image of the biological tissue into a trained cell recognition algorithm model, so as to obtain a plurality of cell regions corresponding to the digital image of the biological tissue and obtain the cell type corresponding to each of the plurality of cell regions.

3. The system according to claim 1, wherein, the calculating the sum of the first effect score, the second effect score corresponding to the lymphocyte abundance parameter, the second effect score corresponding to the plasma cell co-localization parameter, and the second effect score corresponding to the neutrophil co-localization parameter, so as to obtain the therapeutic efficacy score corresponding to the colorectal cancer patient, comprises:
calculating a weighted summed average of the first effect score, the second effect score corresponding to the lymphocyte abundance parameter, the second effect score corresponding to the plasma cell co-localization parameter, and the second effect score corresponding to the neutrophil co-localization parameter, so as to obtain the therapeutic efficacy score corresponding to the colorectal cancer patient; wherein a weight of the first effect score is positively proportional to a total area of all of the tissue regions each having the mucus constituent type as the tissue type; a weight of the second effect score corresponding to the lymphocyte abundance parameter is positively proportional to a total area of all of the cell regions each having the lymphocyte as the cell type; a weight of the second effect score corresponding to the plasma cell co-localization parameter is positively proportional to a total area of all of the cell regions each having the plasma cell as the cell type; a weight of the second effect score corresponding to the neutrophil co-localization parameter is positively proportional to a total area of all of the cell regions each having the neutrophil as the cell type.

4. The system according to claim 1, wherein the digital image of the biological tissue is a digital whole slide image.

* * * * *